July 6, 1943.  L. EDELMANN  2,323,386
THERMOHYDROMETER
Filed June 17, 1940  2 Sheets-Sheet 2
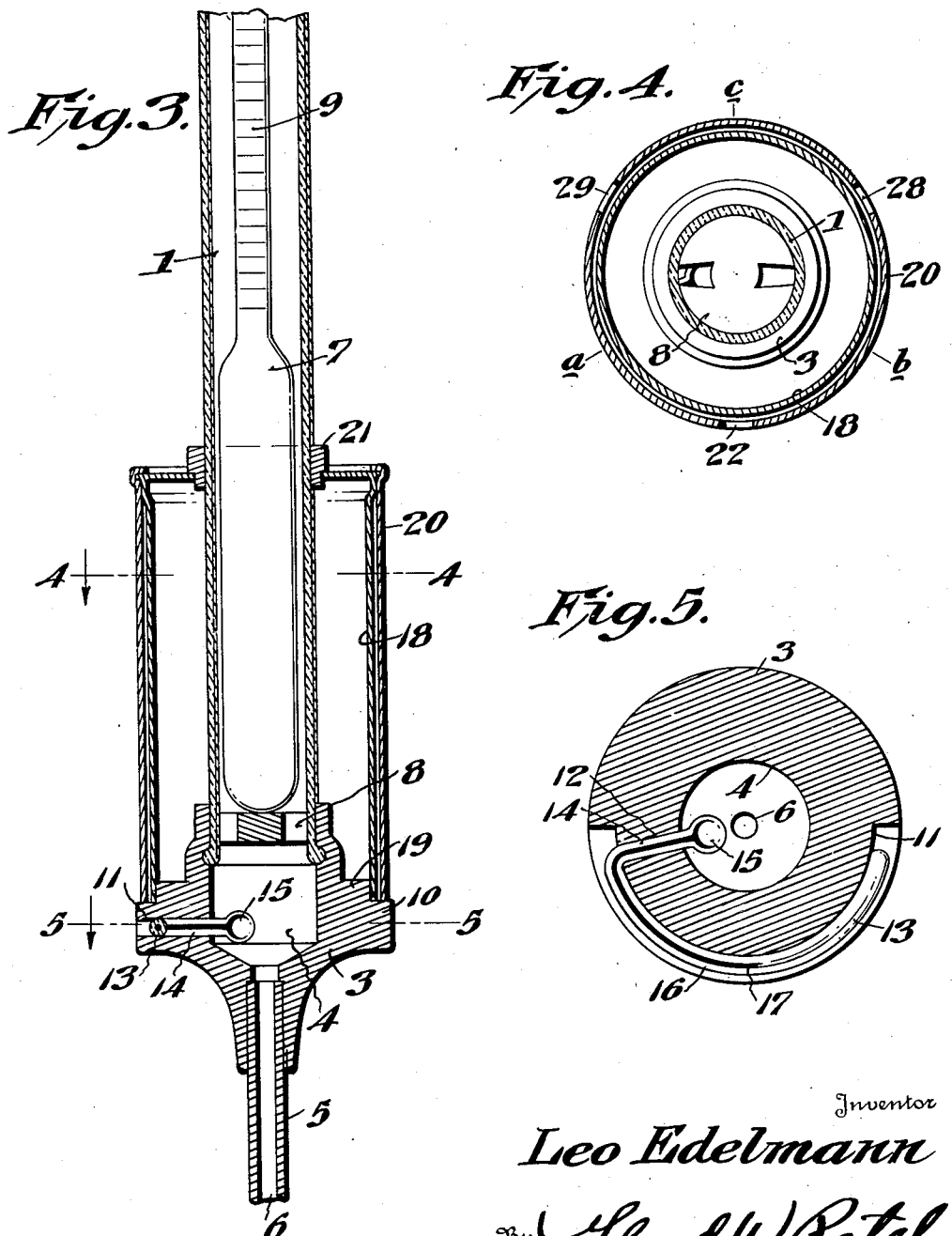
Inventor
Leo Edelmann
By Lloyd W. Patch
his Attorney Patented July 6, 1943

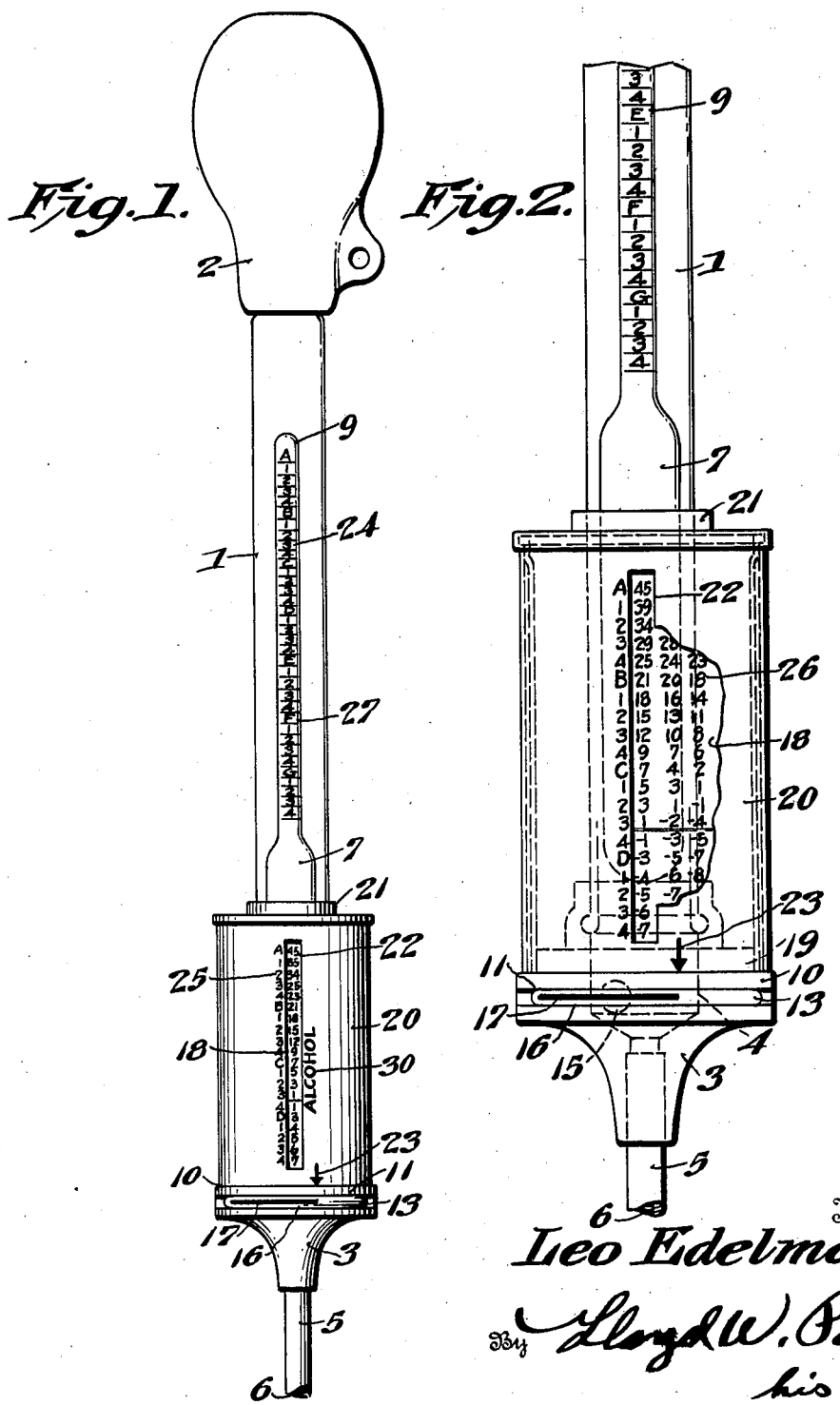

2,323,386

UNITED STATES PATENT OFFICE 2,323,386

THERMOHYDROMETER

Leo Edelmann, Chicago, Ill.

Application June 17, 1940, Serial No. 341,050

7 Claims. (Cl. 265—46)

My present invention relates to improvements in thermohydrometers, and particularly to a specific gravity testing instrument of this character adapted for use in testing radiator solutions as employed in cooling systems of internal combustion engines, and for testing liquids or solutions in other connections where temperature variations will be such as to cause inaccurate indications or readings, thus requiring correction for different temperatures.

The primary purpose of my invention is to provide correction means directly observable and operable with temperature indicating means and specific gravity indicating means, and which will give a direct reading for temperature corrections at any and all temperatures at which the liquid or solution may be corrected, within the field or capacity of the particular instrument.

A further object is to provide a thermohydrometer structure including temperature indicating means and correction indicating means manually operable to the particular temperature indication of the test quantity of liquid or solution as being tested, and which will give an accurate and readily visible figure for freezing temperature or other desired figure or indication for the particular solution at the liquid temperature at which the test is made.

Aonther object is to so construct the parts that a wide range of corrections, and at relatively fine or close liquid temperature variations can be made, with the particular figure or indication clearly and readily available without cross reading or possibility of error.

Still another purpose is to provide an instrument of this character, embodying temperature correction means or parts of such character that when a test quantity of liquid has been taken into the instrument the temperature indication will be almost immediately available, following which the parts can be set without necessity of reference to the specific gravity indicating means, the correction means being manually set to temperature indication, and then when this setting has been manually made the specific gravity indication can be viewed and the desired figure or indication can be immediately and readily ascertained, such figure or indication being presented for direct visible observation and reading.

Still a further purpose of my present invention is to provide an instrument of this character that is of simple and inexpensive construction, and with which the parts are capable of being fitted to and used upon or in connection with various forms and constructions of hydrometer means, and without likelihood of the parts being damaged or misplaced or being otherwise rendered inoperative or inaccurate through ordinary conditions of use.

With the above and other objects in view, some of which will be apparent to those skilled in the art and others of which are inherent in the construction and use of the instrument, my invention includes certain novel features of construction and combinations and arrangements of parts which will be hereinafter set forth in connection with the drawings and then pointed out in the claims.

In the drawings:

Figure 1 is a view in side elevation showing a thermohydrometer instrument constructed in accordance with my invention.

Fig. 2 is an enlarged fragmentary view and with parts broken away to more clearly illustrate the details of construction.

Fig. 3 is an enlarged vertical sectional view.

Fig. 4 is an enlarged transverse sectional view through an instrument substantially in the plane indicated at line 4—4 of Fig. 3, showing modifications.

Fig. 5 is an enlarged transverse sectional view substantially on line 5—5 of Fig. 3.

As disclosed in Figure 1, the liquid barrel 1 or chamber means is made up as an elongated transparent tube, of glass, or other suitable material, with a suction and expulsion bulb 2 mounted at the upper end thereof.

A nozzle tip portion 3 is connected at the lower end of the barrel or liquid chamber means 1, and is provided with a liquid receiving chamber 4 in communication with the interior of the barrel 1. An extension nozzle 5, suitably associated with the nozzle tip portion 3, has a liquid passage 6 therethrough to communicate with the liquid receiving chamber 4. With the parts constructed and assembled in the manner set forth, the bulb 2 can be employed to draw liquid through the extension nozzle 5 and the liquid chamber 4 and into the liquid barrel 1, and reversely the bulb may be employed to expel liquid.

A specific graviy indicating float element 7 is placed within the liquid receiving barrel 1 to be freely movable therein, and a perforated float or stop portion 8, or other suitable means, is preferably provided to keep the float element 7 from moving down into the liquid receiving chamber 4. Also, a similar stop member, or any other suitable stop means, can be employed to keep the upper or gauge stem portion 9 of the float element 7 from rising into the bulb 2; but as such structure is now of well known use in connection with hydrometers, no attempt is here made to particularly illustrate or describe the same in detail. The float element can be of any suitable type and construction and will have the gauge stem 9 thereof provided with scale or indicating markings.

The nozzle tip portion 3, which is conveniently made of soft rubber, has a widened out flange portion, as at 10; and, as is perhaps best shown in Fig. 5, this widened out flange portion is made or provided with a peripherally extending groove 11 around substantially one half of its circumference, and with an opening 12 extending substantially radially adjacent to one end to establish communication into the liquid receiving chamber 4 of this nozzle tip member or portion 3. Temperature indicating means 13, here shown as a capillary tube thermometer, has a portion 14 thereof adjacent to the bulb 15 made substantially straight to fit through the radially extending opening 12 so that the bulb portion 15 is disposed within the liquid chamber 4 and this temperature influenced portion will consequently be subjected to and influenced by the temperature of a test quantity of liquid drawn into the hydrometer and consequently flowing into the liquid receiving passage 4. The thermometer 13 has the indicating portion 16 of the stem thereof formed on a substantially semi-circular curve so that this curved portion will fit and lie within the groove or recess 11 extending peripherally around a part of the laterally disposed flange portion 10 of the nozzle tip 3. As the parts are arranged in this relation, the indicating column 17 of the thermometer will move along the length of the curved portion 16 of the indicating tube, as the temperature of liquid taken into the hydrometer affects the temperature influenced portion 15 of the temperature indicating means 13 as exposed within the chamber 4, and consequently the indicating column 17 will move to the right and to the left as the temperature of the liquid is higher or lower.

Around the lower portion of the barrel 1, I provide a correction table display member 18, which may be conveniently made up as a hollow or tubular and substantially cylindrical shell of metal or other suitable material that will take and display on its outer side correction table figures or other desired and suitable indications. This member 18 can be conveniently made of sheet metal with the desired indications lithographed or otherwise printed on or applied thereto, and the nozzle tip member 3 is provided with a portion 19 adapted to engage and hold the lower end of the correction table display member 18 so that this member will be retained in substantially fixed position and against rotation. A revolvable sleeve or cylinder 20 is mounted around the correction table display member 18 for rotatable movement with respect thereto, and is suitably associated to be held against longitudinal or axial outward movement, so that the member 20 is re-revolvable around the member 18 and at the same time is held against relative axial movement. A tight soft rubber collar 21 fitted upon the liquid receiving barrel 1 is conveniently employed to aid in retaining the parts 18 and 20 in the desired position and association with other parts.

As shown in Figure 1, the revolvable sleeve or cylinder 20 has a slot 22 extending longitudinally through one side, and a pointer arrow or indicating marking 23 is provided on the cylinder 20 in predetermined and fixed positioning with respect to this slot 22. The indicating marking 23 is so located that it can be conveniently brought to a position corresponding with the head of the indicating column 17 of the temperature indicating means 13, upon rotation of the cylinder 20, and the slot 22 is then disposed in predetermined relation and position around the correction table display member 18.

In the present instance I have shown the indicating stem 9 of the float element 7 as marked off on the upper scale length thereof, as at 24, with markings suitable for a liquid or solution lighter than water, as for example a radiator solution containing alcohol as an antifreeze, and adjacent to and along the length of the revolvable cylinder 20 I provide similar markings, as at 25, adjacent to one side of the elongated slot 22. On the correction table display member 18, I display a columnar correction table 26 with the figures in each vertical or axially parallel column relating to certain conditions or characteristics of the liquid or solution to be tested when this liquid is at a temperature within the range of the instrument and the float element at such temperature will be effective to give one of the indications as marked at 25 adjacent to the elongated opening 22. As shown in Fig. 2, the correction table figures are displayed in vertical columns and in substantially peripherally extending rows lining up with the indicating markings at 25.

With this arrangement of the parts, as a test quantity of liquid is drawn into the hydrometer barrel 1, this liquid flows through the chamber 4 and consequently affects the temperature influenced portion 15 of the temperature indicating means 13 so that the indicating column 17 will move substantially peripherally to the right or left to correspond with the temperature of the particular liquid. The operator or user can then turn the revolvable cylinder 20 to bring the indicating marker 23 in a position corresponding with the head of the indicating column 17, and this column of figures of the correction table markings at 26 on the correction table display member 18 will be exposed through the elongated slotted opening 22 to thus be visible closely adjacent to the markings at 25 on the revolvable cylinder 20 corresponding to the effective markings 24 on the gauge stem of the float member 7. The operator then need only note the particular indication on the float stem and by referring to a similar indication at 25 the desired information of the correction table will be immediately available without necessity for figuring or referring to any separate correction table, and without requiring cross reference to two or more columns or designations.

The markings at 27, on the lower part of the scale stem 9 of the float element 7 can be conveniently used to test or show characteristics of a liquid or solution of different specific gravity, as for instance a liquid or solution heavier than water, and with this purpose in mind various zones or portions of the surface of the correction table display member 18 can be marked off or printed or otherwise treated to display correction tables having different characteristics, or tables intended for use with different liquids. Thus, the area from $a$ to $b$ as indicated on Fig. 4, can have a correction table or other data thereon with particular reference to alcohol, the section from $b$ to $c$ may be marked for methanol, and the section from $c$ to $a$ can be marked for ethylene glycol. With this embodiment and adaptation, additional vertically extending slots or openings 28 and 29, corresponding substantially to the opening 22, will be formed at proper locations through the wall of the revolvable member 20, and when the indicating pointer at 23 has been set to correspond with the head of the indicating column 17 the desired reading for the particular liquid can be readily made, substantially as above described, by referring to and taking the reading through the particular slot for the particular liquid being tested. Obviously, the various slots or openings can be marked, as at 30, to indicate the particular liquid for which the correction table or data displayed therethrough is effective.

From the foregoing it will be seen that I have provided a thermohydrometer structure and temperature correcting means therefor which will permit setting of the parts to the particular temperature of the test quantity of liquid and will then give a direct reading of the desired indicating matter when the float element indication is read against a single completely visible scale.

While I have herein shown and described only certain specific embodiments of my invention and have suggested only certain possible changes in the construction and use, it will be appreciated that many changes and variations can be made in the construction and association and assembly and manner of use of the parts, as well as in the hydrometer structure, without departing from the spirit and scope of my invention.

I claim:

1. A hydrometer structure including a float element having gauge markings thereon, a thermometer carried by said hydrometer structure with a portion thereof exposed to the temperature of a solution being tested and having curved indicating column means disposed transversely, a cylindrical portion fixedly carried by the hydrometer in upright relation adjacent to said curved indicating column means having indicating data thereon in upright column arrangements, and a sleeve revolvable on the cylindrical portion provided with an upright elongated opening through which portions of the indicating data in column arrangement can be viewed and having setting pointer means adapted to be brought into registry with the column temperature indication of the thermometer whereby the opening of said sleeve is positioned to expose a certain predetermined column of indicating data on the cylindrical portion having relation to the particular temperature as indicated, said sleeve having markings thereon adjacent to the opening corresponding substantially to the gauge markings of the float element.

2. A hydrometer structure including a float element having gauge markings thereon, a thermometer carried by said hydrometer structure with a portion thereof exposed to the temperature of a solution being tested and having curved indicating column means disposed transversely, a cylindrical portion fixedly carried by the hydrometer in upright relation adjacent to said curved indicating column means having indicating data thereon in upright column arrangements, and a sleeve revolvable on the cylindrical portion provided with an upright elongated opening through which portions of the indicating data in column arrangement can be viewed and having setting pointer means adapted to be brought into registry with the column temperature indication of the thermometer whereby the opening of said sleeve is positioned to expose a certain predetermined column of indicating data on the cylindrical portion having relation to the particular temperature as indicated, said cylindrical portion having the indications thereon in columns disposed substantally longitudinally and rows disposed peripherally, said sleeve having markings thereon adjacent to the opening corresponding substantially to the gauge markings of the float element.

3. A thermohydrometer comprising, a liquid barrel, means at one end of the barrel to draw liquid thereinto, a float element having gauge markings thereon in said barrel, a nozzle member at the other end of the barrel through which liquid is drawn, said nozzle member having a peripherally extending groove, a thermometer having a curved indicating stem in said groove and having a temperature influenced portion exposed to a test quantity of liquid as drawn into said barrel, a cylindrical portion fixedly carried by the liquid barrel adjacent to said curved indicating portion of the thermometer having thereon indicating data for temperature correction, and a sleeve revolvably mounted around said cylindrical portion provided with an opening through which a portion of the indicating data on the cylinder can be viewed and having a locater pointer adapted to be positioned with respect to the indicating portion of the thermometer to expose through the opening certain predetermined portions of the surface of the cylinder at different temperatures as indicated, said sleeve having thereon adjacent to the opening markings corresponding to the gauge markings of said float element.

4. A thermohydrometer comprising a liquid barrel, a nozzle portion at one end of the barrel having a liquid passage therethrough, means at the other end of the barrel to draw liquid into said barrel through the passage, a float element having gauge markings thereon in said liquid barrel, said nozzle portion being provided with an opening leading to the liquid passage, a thermometer having a substantially semi-circular indicating tube disposed around a part of said nozzle portion and having a temperature influenced portion received through the opening and exposed to liquid as taken into the liquid barred, a substantially cylindrical portion around said liquid barrel adjacent to the thermometer indicating tube having thereon indicating data based upon liquid temperature differences, and a sleeve revolvable around said cylindrical portion provided with pointer means settable to the indicating means of the curved thermometer tube and having an opening therethrough through which indications on the cylindrical portion are exposed, said sleeve having markings thereon adjacent to the opening substantially aligned with characters of the indicating data on the cylindrical portion and corresponding to gauge markings on the float element.

5. A thermohydrometer comprising a liquid barrel, a nozzle portion at one end of the barrel having a liquid passage therethrough, means at the other end of the barrel to draw liquid into said barrel through the passage, a float element having gauge markings thereon in said liquid barrel, said nozzle portion being provided with an opening leading to the liquid passage, a thermometer having a substantially semi-circular indicating tube disposed around a part of said nozzle portion and having a temperature influenced portion received through the opening and exposed to liquid as taken into the liquid barrel, a cylindrical member mounted in fixed relation around the liquid barrel adjacent to the curved thermometer indicating tube, and a sleeve revolvably mounted with respect to the cylinder having pointer means thereon settable to the indication of the thermometer and provided with a plurality of peripherally spaced longitudinally extending slotted openings, said cylindrical member having in the zone of each of said slots indicating matter related to particular temperatures to be viewed through the slots of the revolvable sleeve and said sleeve having markings thereon adjacent to each of the slots corresponding to gauge markings on the float element.

6. A thermohydrometer comprising an elongated tubular liquid barrel adapted to contain a quantity of liquid solution being tested, a suction bulb at the upper end of said barrel, a nozzle member at the lower end of said barrel through which liquid is drawn, a specific gravity float element in said barrel having gauge markings thereon, a temperature indicating thermometer provided with a curved indicating tube mounted peripherally around a portion of the nozzle member and having a temperature influenced portion thereof exposed to the temperature of the liquid within the liquid barrel, a cylindrical indicating data carrying portion fixedly carried by said nozzle member adjacent to the indicating portion of the thermometer and having data thereon displayed in upright columns with the data of the several columns substantially aligned peripherally, and a sleeve revolubly mounted around said cylindrical portion having a locating pointer thereon for registry with the temperature indicating portion of the thermometer tube and provided with an upright elongated opening through which a registering column of data on the indicating cylinder can be viewed, said sleeve having markings thereon adjacent to the elongated opening corresponding to gauge markings of said float element.

7. A thermohydrometer comprising an elongated transparent tubular liquid barrel, a suction bulb at the upper end of said liquid barrel, a liquid intake nozzle member at the lower end of said liquid barrel having an outstanding flange portion provided with a peripherally extending groove and having an opening from said groove to the liquid passage, a thermometer having a curved indicating tube fitted within the groove and having a temperature influenced portion received through said opening and thus exposed to the temperature of a test quantity of liquid taken through said nozzle member into the liquid barrel, a specific gravity float element in said liquid barrel having a gauge stem portion provided with gauge markings, a cylindrical indications displaying portion fixedly carried by the nozzle member adjacent to the indicating tube of the thermometer, said cylindrical portion having indicating data thereon in upright columns and with the data of the several columns substantially aligned peripherally, and a sleeve revolubly mounted around said cylindrical portion provided with an upright slotted opening through which a column of data on the cylindrical portion can be viewed, said revoluble sleeve having a locater pointer thereon adapted to be positioned with respect to the indicating portion of the thermometer to expose through the opening certain predetermined columns of data on the surface of the cylinder at different temperatures as indicated, and said revoluble sleeve having thereon adjacent to the opening an upright column of designations corresponding to gauge markings on the float gauge stem.

LEO EDELMANN.